B. G. PATTERSON.
NUT LOCK.
APPLICATION FILED JUNE 30, 1919.

1,340,496.

Patented May 18, 1920.

WITNESSESS
T.C. Mankin.
J.S. Brock

Inventor
B. G. PATTERSON,

By Munn & Co.
Attorney

UNITED STATES PATENT OFFICE.

BENJAMIN G. PATTERSON, OF FAYETTEVILLE, ARKANSAS.

NUT-LOCK.

1,340,496.   Specification of Letters Patent.   Patented May 18, 1920.

Application filed June 30, 1919. Serial No. 307,686.

*To all whom it may concern:*

Be it known that I, BENJAMIN G. PATTERSON, a citizen of the United States, and a resident of Fayetteville, in the county of Washington and State of Arkansas, have invented certain new and useful Improvements in Nut-Locks, of which the following is a specification.

This invention is an improvement in nut locks, and has reference more particularly to a nut in which a springy or resilient portion is provided to render the nut self locking.

An object of the invention is to provide a simple one-piece nut which can be manufactured at low cost, which shall be of substantially the same dimensions, as standard commercial nuts, and which shall be capable of being locked in position upon a bolt by screwing it tightly against a load surface.

Another object of the invention is to provide a self locking nut that can be quickly applied by an unskilled person and which can be repeatedly used without injury to either the nut itself or the bolt upon which it is placed.

Figure 4:
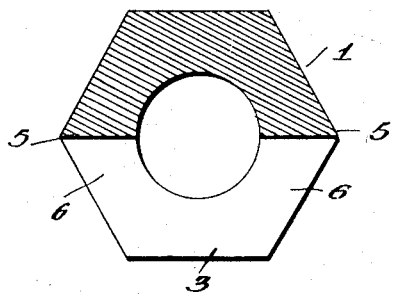
Figure 5:
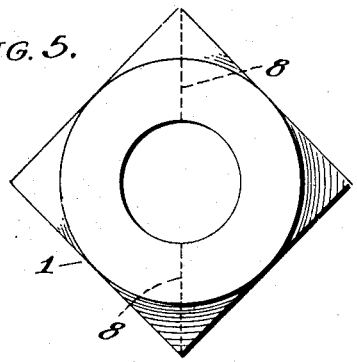
Figure 1:
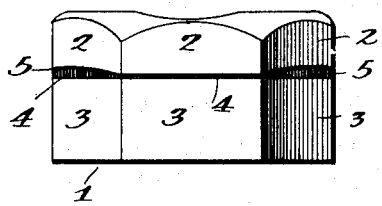
Figure 2:
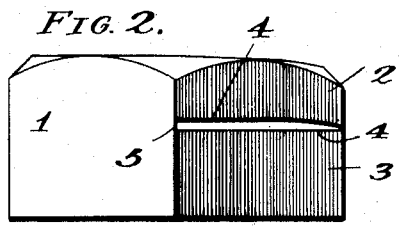
Figure 3:
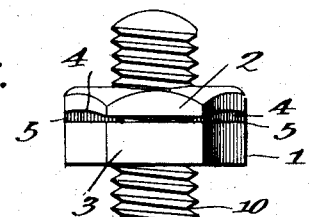
Figure 6:
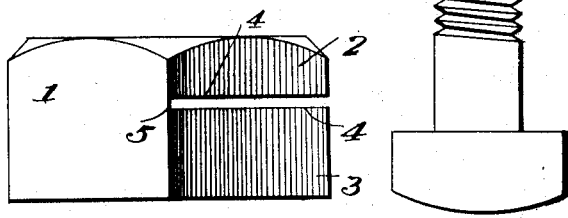

With these and other objects in view, my invention consists in certain novel features of manufacture, construction, arrangement and combination of parts as will be hereinafter fully described and pointed out in the claim, reference being had to the accompanying drawing forming a part hereof, in which:

Figure 1 is a front elevation of a hexagonal nut finished and embodying my invention, Fig. 2 is a side elevation of the same, Fig. 3 is a side elevation showing the same applied, Fig. 4 is a sectional view showing slot, Fig. 5 is a plan view of a square nut embodying my invention, Fig. 6 is a side elevation of a nut before the resilient locking portion is deflected.

Referring now more particularly to the drawing, and Figs. 1, 2, and 3 thereof, 1 indicates an ordinary standard commercial nut, portions of which appear at 2 and 3, and are divided by a slot at 4, the slot terminating at 5. In making nuts of this character, it is desirable to deflect or set down the portion 2 without applying heat, hence the nut should be worked cold. After the nut has been slotted as at 4 force is applied to deflect or set down the portion 2 in the manner as shown in Figs. 1 and 2.

The point of greatest strain during the deflection will be in a line with the terminus of the slot, and it is an essential feature of my invention that the slot 4 terminates in the thicker portions of the nut or in a line running from the opposite corners of the nut thus making the point of greatest strain where the bending takes place, much stronger and providing a gradually decreasing strength of metal away from the terminus of the slot. Thus the weakest point in the portion 2 appearing at about the places indicated by 6—6 in Fig. 4.

When the nut is slotted in this manner, that is with the terminus of the slot in line with the corners or thickest portion of the nut and pressure is applied at the outer edge of portion 2, a bend will occur at considerable length along the gradually increasing and decreasing thickness of metal indicated at 6—6.

The deflection thus made, does not injure the bond of the metal and results in providing a springy effect in the portion 2 which is of great advantage in gripping and maintaining a friction in the threads of the nut and bolt.

When a nut is thus made, it may be put on and taken off the bolt a great many times without destroying the resiliency in the portion 2. This arrangement provides a strong grip in the threads, and one that is self adjusting and does no injury to the threads.

When the nut is slotted in the manner hereinbefore set forth, that is near the outer face of the nut, it leaves the portion 2 thinner than the portion 3, and hence springy or resilient.

Now when the portion 2 is deflected toward the portion 3, a slight displacement of the threads inside the nut takes place; however, when the nut is screwed on the bolt 10, the threads of the bolt will follow in the threads in the displaced portion and tend to force that portion into normal position as shown in Fig. 3, the portion 2 giving a spring resistance and thereby causing a friction which tightens the nut to the bolt in a desirable manner, that is without stripping or injuring the threads.

In Fig. 5, I have indicated how my invention may be taken advantage of in a square nut, as shown by the dotted line 8 which represents the terminus of the slot. This terminus is in the line from diagonally opposite corners and hence in the thickest portion of such a shaped nut.

I claim:—

A one-piece self locking nut provided with a threaded bolt hole, and a transverse slot extending inwardly from one side thereof parallel with the lower face and terminating in a transverse line coincident with a line drawn from diagonally opposite corners, said slot piercing the nut adjacent the non-load face of the nut, and forming a resilient portion, the free end of said resilient portion deflected toward the load portion of the nut.

BENJAMIN G. PATTERSON.